March 10, 1936.　　　M. LEUPOLD　　　2,033,433
PEDAL MECHANISM
Filed Nov. 26, 1934　　　2 Sheets-Sheet 1
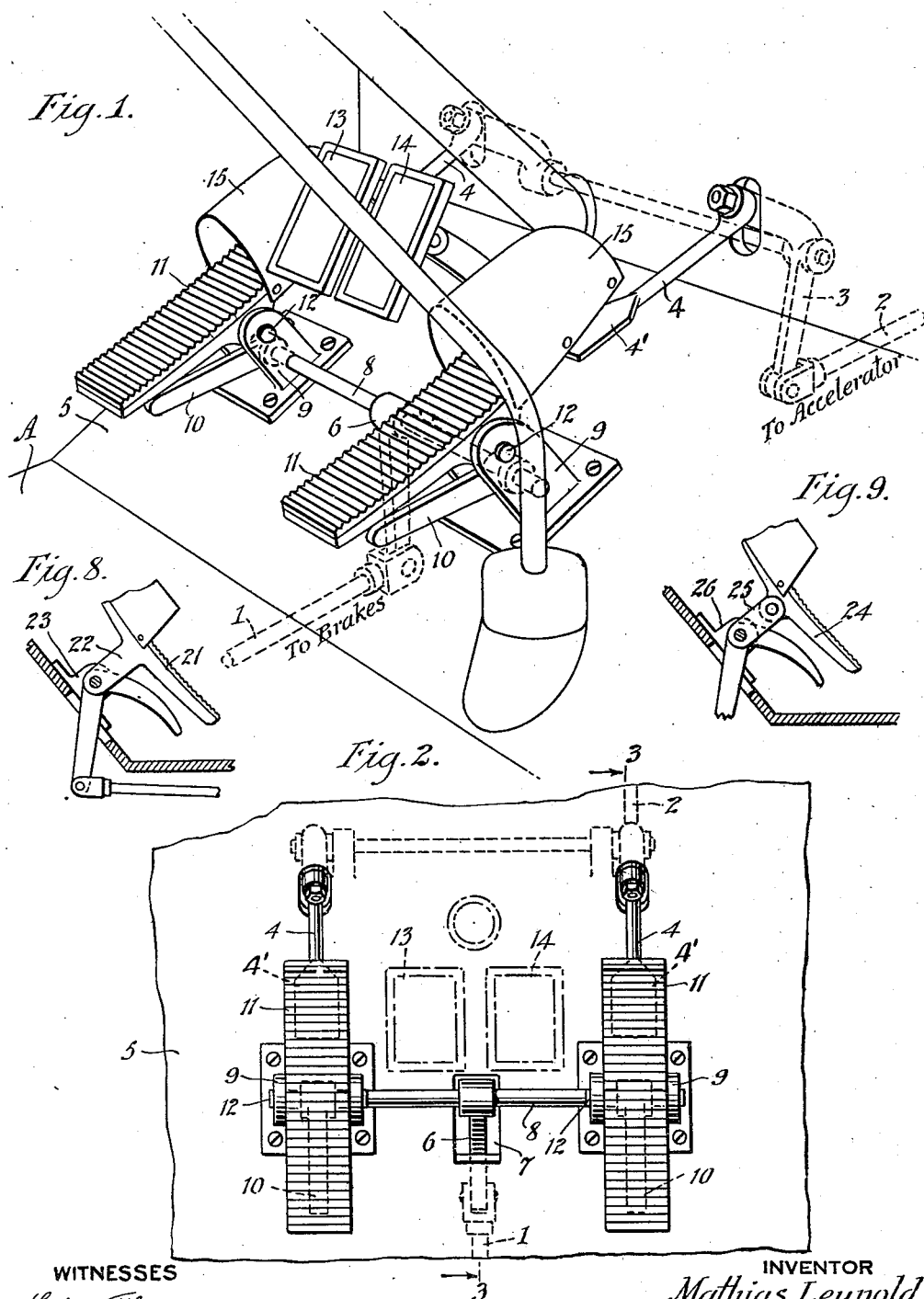
WITNESSES
Edw. Thorpe
D. W. Porter
INVENTOR
Mathias Leupold
BY
Munn, Anderson & Liddy
ATTORNEY

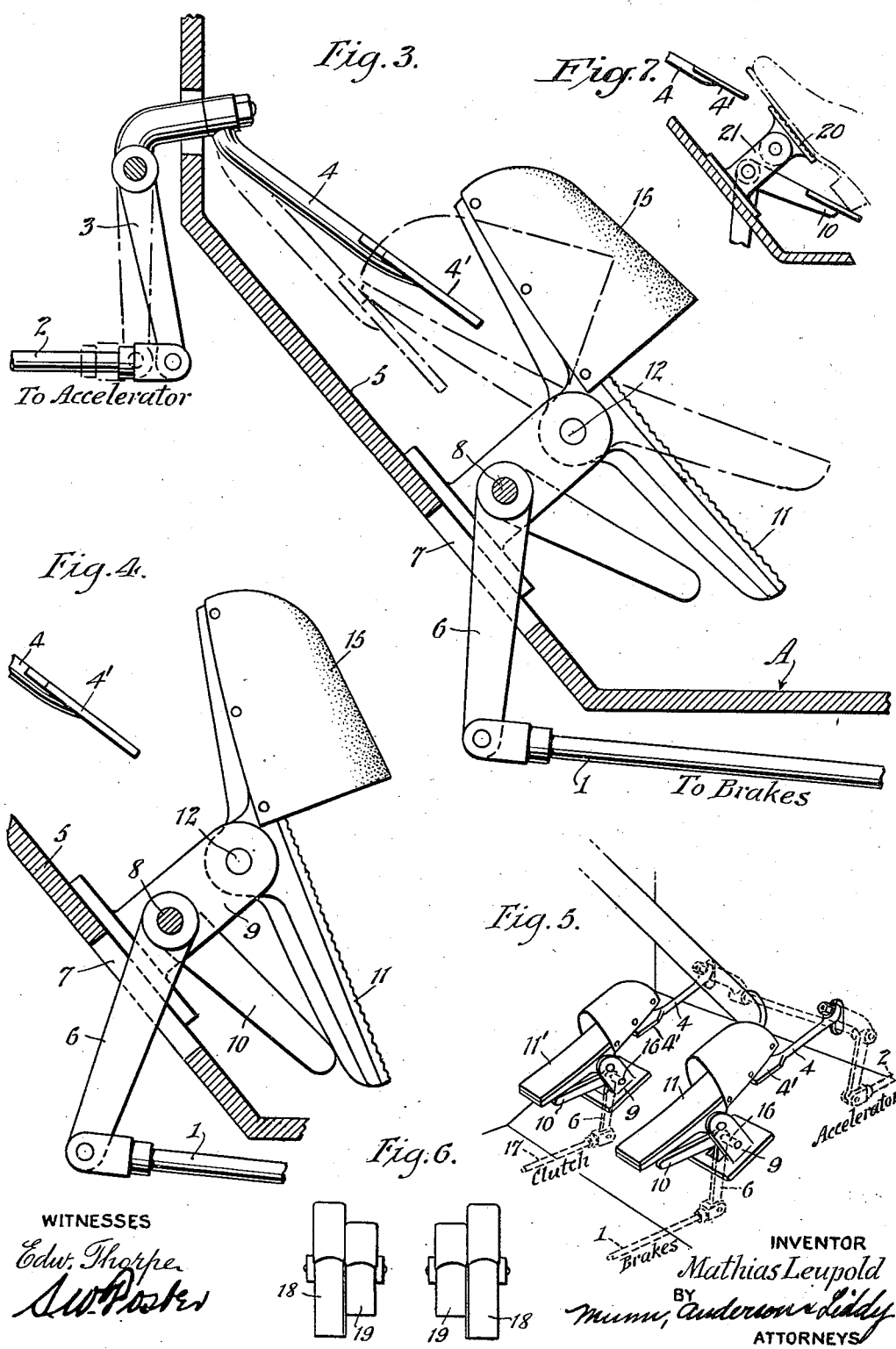

Patented Mar. 10, 1936

2,033,433

UNITED STATES PATENT OFFICE 2,033,433

PEDAL MECHANISM

Mathias Leupold, Jamaica, N. Y.

Application November 26, 1934, Serial No. 754,886

6 Claims. (Cl. 192—.01)

This invention relates to pedal mechanism for motor vehicles, an object of the invention being to provide an improved construction of pedal which facilitates the driving of an automobile, reducing to a minimum the fatigue of driving, and giving greater comfort, ease and safety than has been possible heretofore.

A further object is to provide a pedal pivoted intermediate its ends and arranged so that when the forward portion of the pedal is forced downwardly it will operate to accelerate the car, and when the rear portion of the pedal is forced downwardly it will operate to cause the brakes to be applied, thus allowing the driver to rest his foot easily and comfortably upon the pedal and cause the pedal to move on its pivot to control the operation in driving the car.

A further object is to provide a pair of this type of pedals pivoted between their ends so that either the right or left foot may be utilized to cause the motor to be accelerated and apply the brakes, thus allowing the driver to use either foot and dispense with the fatigue which is now felt by always using the right foot to accelerate the car.

A further object is to provide a pedal or pedals of this character with a toe covering which facilitates the pivoting of the pedal by the action of the foot, the toe being utilized both for depressing the forward end of the pedal and for lifting the same, in addition to the action of the heel. Furthermore, a covering of this kind can be made so that it will be warm in winter to keep the toes warm or it may be in skeleton form for summer use.

My invention includes not only the utilizing of pedals of this character for the acceleration and braking of the car, but also to control the clutch so that the driver may keep his feet on the pedals and control the speed of the car, and also cause the release of the clutch.

My invention also includes the use of pedals, of the character stated in duplex form, that is, each pedal constitutes two foot rests, one foot rest being larger than the other and the smaller foot rests being nearer to each other than are the larger foot rests so that drivers of different sizes may conveniently operate the same car.

With these and other objects in view, the invention consists in certain novel features of construction and combinations and arrangements of parts, all of which will be more fully hereinafter described and pointed out in the claims.

In the accompanying drawings—

Figure 1 is a perspective view illustrating my improved arrangement of pedals located at opposite sides of the brake and clutch pedals with which cars are now ordinarily provided; in other words, this view illustrates my invention as an addition to the present car equipment;

Figure 2 is a fragmentary plan view, the toe covers of the pedals being removed;

Figure 3 is a view in longitudinal section taken on the line 3—3 of Figure 2, showing the pedal in full lines in an inactive position and in dot and dash lines in a position to operate the accelerator;

Figure 4 is a fragmentary view similar to Figure 3 showing the pedal in position to apply the brake;

Figure 5 is a perspective view illustrating my arrangement of pedals controlling the acceleration, application of the brakes and the operation of the clutch;

Figure 6 is a plan view illustrating my improved arrangement of duplex pedals;

Figure 7 is a view in side elevation illustrating a modified form of pedal in which the pedal is pivoted, supporting the foot so that the toe and heel of the shoe come in contact with the accelerating and braking means;

Figure 8 is a broken fragmentary view in sectional elevation illustrating a modified form of pedal; and Figure 9 is a view similar to Figure 8 illustrating another modified form of pedal.

The reference character A is employed to indicate generally an automobile or motor vehicle of any type, and it is understood, of course, that the automobile may be equipped with any type of brake mechanism and any type of motor. I have illustrated in the drawings a rod 1 which it is understood is operatively connected to the brake mechanism or to a control for the brake mechanism or to any means, either automatic or otherwise, which controls or applies the brakes. I also illustrate a rod 2 which it is understood is operatively connected to the means which accelerates the motor, and this rod 2 is connected to one end of a pivoted lever 3. Two accelerator pedals 4 are connected to the lever 3 so that when either of the pedals 4 are depressed they cause the rod 2 to move in a direction to accelerate the speed of the motor. These accelerated pedals have what is commonly known in the art as pads 4' at their free ends which are directly engaged and it is understood that I use this term "pad" to include any means which can be depressed to operate the accelerator rod.

The rod 1 controlling the brakes is connected to a crank arm 6 extending through a slot 7 in the foot board 5 and fixed to a shaft 8 above the foot board. This shaft 8 is mounted in suitable bifurcated brackets 9 fixed to the foot board and having rearwardly projecting crank arms 10 thereon. The brackets 9 also provide pivotal mounting for my improved pedals 11. These pedals 11 are of the desired length and are pivotally supported intermediate their ends. As a pivotal means I have illustrated pivot pins 12 which are supported in brackets 9 and extend through the intermediate portions of the pedal. These pedals 11 may be used on cars which are equipped with the ordinary clutch and brake pedals 13 and 14, respectively, and when used in connection with such brake and clutch pedals are preferably disposed on opposite sides of the said pedals in a convenient position to receive and support the feet of the driver.

The forward ends of the pedals 11 are located above the accelerator pads 4' so that when either pedal is pivoted so as to move the forward end thereof downwardly it will cause the motor to be accelerated. The rear ends of the pedals 11 are located above the crank arms 10 so that when either or both pedals are pivoted to depress the rear portion thereof the brakes will be applied. It will thus be noted that the driver moves his foot or feet naturally, pivoting the same from the ankle, so that a downward pressure of the toes will cause the car to be accelerated and a downward pressure of the heel will cause the brakes to be applied. The forward or toe portions of the pedals 11 are preferably provided with shields or toe coverings 15. These coverings may take any suitable form, that is to say, they may give warmth to the toe in winter or they may be of skeleton form for summer use, but they have not only the function of giving warmth to the toes but also permit the toe portion of the foot to assist the heel portion of the foot in pivoting the pedals in the application of the brakes. It is, of course, to be understood that when both pedals are used to apply the brakes, an automatic clutch mechanism may be employed.

As illustrated in Figure 5 of the drawings, one of the pedals 11' preferably the left pedal, which receives the left foot of the driver may instead of operating the brake operate the clutch. In this variation of my invention the shaft 8 above referred to is not employed, and short stubs or pivot pins 16 are mounted in the brackets 9 and support the crank arms 10 and 6. The crank arm 6 below the right foot pedal is operatively connected to the rod 1 controlling the brakes and the crank arm 6 below the left pedal is operatively connected to a rod 17 which controls the clutch. It is understood that this clutch controlled means may be of any form and the understanding is that movement of the rod 17 in one direction releases the clutch and when moved in the other direction permits the application of the clutch.

In Figure 6 I illustrate my improved arrangement of duplex pedals 18 and 19; that is to say, each duplex pedal 18 and 19 which constitutes a single movable member provides two foot rests of different size; the smaller foot rests of the respective pedals being adjacent each other. This is to allow for the comfortable driving of two persons of different sizes. Figure 7 illustrates a modification of my improved pedal in which a pedal 20 is relatively short but is pivotally mounted in a suitable bracket 21, and this pedal 20 receives the intermediate portion of the foot allowing the toe and heel to project beyond the pedal and directly engage the accelerator pads 4' and brake-applying lever 10, respectively.

With my improved arrangement of pedals it will be apparent that the driver of the car can rest his feet comfortably upon the pair of pedals, and he can cause the pedals to pivot to control the speed, apply the brakes, and operate the clutch, without removing his feet from the pedals. He can accelerate the motor with either foot so that in long distance driving he can rest one foot and use the other.

In Figure 8 I have illustrated a modified form of pedal in which the pedal 21 is provided intermediate its ends with an integral depending arm 22 which is pivotally supported in a bracket 23 on the floor board. In the modification illustrated in Figure 9 of the drawings, the pedal 24 is pivotally connected intermediate its ends by means of a link or links 25, said link or links pivotally connected at their lower ends to a fixed support or bracket 26 on the floor board.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. The combination with a motor vehicle, of a pair of pedals pivotally mounted intermediate their ends, a single accelerator rod, a pair of accelerator pads operatively connected to the rod and located under the forward ends of the pedals and operated by the forward ends of the pedals, a brake mechanism operated by the rear end of one pedal, and a clutch mechanism operated by the rear end of the other pedal.

2. The combination with a motor vehicle, of a pair of foot pedals located side by side and pivotally mounted intermediate their ends, a single accelerator rod, a pair of accelerator pads operatively connected to the rod and located below the forward portion of both pedals, and brake means below the rear portions of the pedals.

3. The combination with a motor vehicle, of a shaft supported above the floor of the vehicle, a pair of pedals extending over the shaft and pivoted intermediate their ends, crank arms extending rearwardly from the shaft and located under the rear ends of the pedals and movable thereby when the rear ends of the pedals are moved downwardly, a brake operating arm on said shaft, and accelerator pads under the forward ends of the pedals and operated by the downward movement of the forward ends of the pedals.

4. The combination with a motor vehicle, of a pair of foot pedals pivotally mounted intermediate their ends and disposed in substantial parallelism whereby both feet of the operator rest comfortably upon the pedals, a single accelerator rod, a pair of accelerator pads operatively connected to the rod and located under the forward ends of the pedals and operated by the downward movement of the forward ends of both pedals, and other control means operated by the downward movement of the rear ends of both pedals.

5. The combination with a motor vehicle, of a pair of foot pedals pivotally mounted intermediate their ends and disposed in substantial parallelism whereby both feet of the operator rest comfortably upon the pedals, a single accelerator rod, a pair of accelerator pads operatively connected to the rod and located under the forward ends of the pedals and operated by the downward movement of the forward ends of both pedals, pivoted levers having their free ends located under the rear ends of the pedals, said levers operatively connected to control means of the motor vehicle, and said levers and their control means operated by the downward movement of the rear ends of the pedals.

6. The combination with a motor vehicle, of a pair of foot pedals pivotally mounted intermediate their ends and disposed in substantial parallelism whereby both feet of the operator rest comfortably upon the pedals, a single accelerator rod, a pair of accelerator pads operatively connected to the rod and located under the forward ends of the pedals and operated by the downward movement of the forward ends of both pedals, and other control means operated by the downward movement of the rear ends of both pedals, and toe coverings on the forward ends of the pedals under which the toes of the foot are positioned so that when a downward movement of the heel is had the toes of the foot exert a lifting action against the toe coverings and assist in such operation.

MATHIAS LEUPOLD.